United States Patent [19]  [11] 3,969,488
Shaw  [45] July 13, 1976

[54] PROCESS FOR THE MANUFACTURE OF SODIUM CARBONATE

[75] Inventor: Alan C. Shaw, St. Catharines, Canada

[73] Assignee: The Ontario Paper Company Limited, Thorold, Canada

[22] Filed: Aug. 25, 1975

[21] Appl. No.: 607,229

[52] U.S. Cl. ................................. 423/421; 423/629
[51] Int. Cl.² ..................... C01D 7/00; C01F 7/34
[58] Field of Search ........... 423/629, 421, 111, 131, 423/127, 129

[56] References Cited
UNITED STATES PATENTS

| | | | |
|---|---|---|---|
| 1,898,830 | 12/1931 | Guthrie et al. | 423/629 |
| 2,894,898 | 7/1959 | Oettinger et al. | 423/629 |
| 3,652,208 | 3/1972 | Burk et al. | 423/421 |
| 3,787,283 | 1/1974 | Sheeley et al. | 423/207 |

*Primary Examiner*—Oscar R. Vertiz
*Assistant Examiner*—Gary P. Straub
*Attorney, Agent, or Firm*—Sim & McBurney

[57] ABSTRACT

Sodium carbonate is formed by reaction between particulate sodium aluminate in solid form, and carbon dioxide and water vapor in gaseous form. The sodium carbonate is readily separated from by-product hydrated alumina for recovery in pure form, or the dry product of the reaction may be employed directly where a dry sodium carbonate feed is desired, with the hydrated alumina being filtered off prior to further processing.

14 Claims, No Drawings

PROCESS FOR THE MANUFACTURE OF SODIUM CARBONATE

FIELD OF INVENTION

This invention relates to a method for production of sodium carbonate from sodium aluminate.

BACKGROUND TO THE INVENTION

It is well known that aqueous solutions of sodium aluminate have a strongly alkaline reaction. Aqueous solutions of sodium aluminate, therefore, will react with carbon dioxide according to the equation:

$$2NaAlO_2 + 3H_2O + CO_2 \rightarrow Na_2CO_3 + 2Al(OH)_3$$

Unfortunately when the reaction is carried out in this manner, the aluminum hydroxide is precipitated in a bulky, gelatinous form which occludes large volumes of liquor, containing product sodium carbonate, and is very slow to filter. Variations in temperature, concentration, stirring or rate of addition are not effective in yielding a precipitate which can be handled practically on an industrial scale. A further disadvantage of the process is that it yields sodium carbonate as an aqueous solution which must either be concentrated and dried, or employed as an aqueous solution, which in many applications would result in an undesirable dilution.

SUMMARY OF INVENTION

It has now been surprisingly found that sodium carbonate may be formed by reaction of sodium aluminate with carbon dioxide and water vapor in the gaseous phase. The reaction goes essentially to completion and the product of the reaction is a free-flowing solid from which sodium carbonate may readily be leached with water, leaving a by-product aluminum hydroxide or hydrated alumina which is dense and filters rapidly.

In applications where it is desirable to add sodium carbonate in dry form to an aqueous system, the dry product of the reaction may be employed directly and by-product hydrated alumina filtered off prior to further processing. In this way, undesirable dilution resulting from use of sodium carbonate solutions is avoided.

GENERAL DESCRIPTION OF INVENTION

Any source of sodium aluminate or sodium aluminate-containing material may be used as the starting material in the process of this invention. The process is particularly applicable to sodium aluminate-containing mixtures produced when pulping chemicals are recovered by the method of U.S. Pat. No. 3,787,283. (Canadian Patent No. 958,159).

In the latter method, concentrated spent sodium sulfite pulping liquor is mixed with alumina and recycled sodium aluminate to form sodium aluminate in a quantity sufficient to absorb the other spent pulping liquor components and to form a solid particulate mass. The particulate mass is combusted and part of the resulting sodium aluminate is recycled to the mixing step. The remainder of the sodium aluminate may be treated by the process of the invention.

The temperature of the reaction components in the process of the invention must be above the dew point of the gaseous phase, preferably above about 100°C, and up to about 200°C. For reasons of convenience and energy economy, the preferred temperature range is between about 100° and about 150°C.

Operation at temperatures below about 100°C is possible, but the above dew point requirement severely limits the amount of water vapor which can be carried in the gaseous phase at such operating temperatures. Since the reaction requires a minimum of 1.5 moles of water per mole of aluminum for complete reaction of all the aluminum values, the volume of gas which must be contacted with the sodium aluminate increases greatly below 100°C.

The sodium aluminate is provided in a subdivided form for contact with the gaseous phase to allow a rapid reaction to occur. In general, particles of sodium aluminate larger than ¼ inch are undesirable because excessive times are required for the gaseous reactants to diffuse to their centers. Further, particles smaller than about 100 mesh require excessive grinding energy and may give rise to dust problems in handling. In the present invention, it is preferred to crush the sodium aluminate to about 50 to about 100 mesh.

The quantities of water vapor and carbon dioxide used are set by the stoichiometry of the reaction and must be at least 1.5 moles of water vapor per mole of aluminum, and one-half mole of carbon dioxide per mole of sodium to achieve complete reaction of the sodium aluminate, although lesser quantities may be used if sodium aluminate can be tolerated in the product.

It is preferred, however, to use substantial excesses of both water vapor and carbon dioxide, and to recycle exhaust gases from the reactor after fortification with steam and carbon dioxide.

Sodium aluminate obtained from the process of U.S. Pat. No. 3,787,283 is substantially anhydrous. However, sodium aluminate from other sources may contain up to 20% moisture as water of hydration. Such materials also may be used as starting materials in this invention. Obviously less water need be employed in the gaseous phase when the sodium aluminate feed contains water of hydration. The requirements for the successful practice of the invention are that at least 1.5 moles of water per mole of sodium aluminate be employed and that water in the liquid phase be substantially absent from the reaction mixture.

If desired the reaction of sodium aluminate with carbon dioxide and water may be carried out in two steps. In the first step sodium aluminate is converted to a hydrated form by treatment with water in either gaseous or liquid form. If liquid water is employed, the amount used must not exceed the amount with which sodium aluminate is capable of combining, usually about 20% of the weight of the sodium aluminate. The essential requirement is that the product of the first stage hydration be a dry free-flowing powder from which a liquid water phase is substantially absent.

In the second step the hydrated sodium aluminate is contacted with gaseous carbon dioxide in amounts of at least ½ mole per mole of sodium, and enough water in gaseous form to supplement the water in hydrate form to give a total of at least 1.5 moles of water per mole of aluminum.

The time of reaction is dependent on the reaction conditions and, in general, is shorter, the finer the state of subdivision of the sodium aluminate, the higher the temperature and the higher the partial pressures of water vapor and carbon dioxide in the gaseous phase. For any particular combination of conditions the required reaction time is easily determined by experimentation.

The reactants may be brought into contact with each other in any convenient manner. For example, the reaction may be carried out in a ball mill purged with the gaseous reactants, so that size reduction and reaction occur simultaneously. The reaction may also be carried out in fluidized beds.

The reaction further may be carried out in a countercurrent fashion in a tower wherein subdivided sodium aluminate is fed into the top continuously, the gaseous reactants are fed to the bottom continuously and carbonated product is removed at the bottom, via screw conveyors, or other convenient means.

EXAMPLE

The invention is illustrated by the following Example:

70 g. of sodium aluminate was tumbled in a heated ball mill at 25 rpm and 190 ml/min. of moist carbon dioxide (dew point 80°C) were passed through at a temperature of 125°C for 430 minutes. 95.7% conversion of sodium aluminate to sodium carbonate was obtained. The product was readily leached with water, leaving a dense, easily filtered residue of hydrated alumina.

SUMMARY

It will be seen, therefore, that the present invention provides a simple yet effective manner of forming sodium carbonate from sodium aluminate. Modifications are possible within the scope of the invention.

What I claim is:

1. A process for the production of sodium carbonate, which comprises contacting subdivided solid sodium aluminate with a gas stream comprising water vapor and carbon dioxide at a temperature above the dew point of said atmosphere and below about 200°C to cause reaction between said sodium aluminate, carbon dioxide and water vapor in accordance with the equation:

$$2NaAlO_2 + 3H_2O + CO_2 \rightarrow Na_2CO_3 + 2Al(OH)_3$$

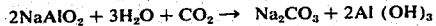

and recovering a solid mass containing sodium carbonate.

2. The process of claim 1 wherein said contact is continued until substantially complete conversion of said sodium aluminate to sodium carbonate and hydrated alumina in accordance with said equation has occurred.

3. The process of claim 1 wherein said temperature is about 100° to about 150°C.

4. The process of claim 1 wherein said sodium aluminate has a particle size of about 50 to about 100 mesh.

5. The process of claim 1 wherein said solid mass is leached with water to remove the sodium carbonate content thereof and leave by-product hydrated alumina.

6. The process of claim 1 wherein said sodium aluminate is subdivided and contacted with said gas stream simultaneously.

7. The process of claim 1 wherein said solid sodium aluminate is in the form of anhydrous sodium aluminate.

8. The process of claim 1 wherein the amounts of water vapor and carbon dioxide supplied are at least 1.5 moles of water vapor for each mole of aluminum in said sodium aluminate and at least one-half mole of carbon dioxide for each mole of sodium in said sodium aluminate.

9. The process of claim 8 wherein said gas stream contains an excess of said quantities of water vapor and carbon dioxide and, after recovery of said solid mass, carbon dioxide and water vapor are added to the resulting depleted gas stream to provide a regenerated gas stream for recycle for a further contact reaction.

10. The process of claim 8 wherein said temperature is about 100° to about 150°C, said sodium aluminate has a particle size of about 50 to about 100 mesh and said contact is continued until substantially complete conversion of said sodium aluminate to sodium carbonate and hydrated alumina in accordance with said equation has occurred.

11. The process of claim 1 wherein said sodium aluminate is formed by heating spent soda-based pulping liquor with alumina.

12. The process of claim 11 including separating hydrated alumina from said solid mass and using said latter hydrated alumina as at least part of said hydrated alumina reacted with said spent soda-based pulping liquor.

13. The process of claim 1 wherein said solid sodium aluminate is in the form of hydrated sodium aluminate.

14. The process of claim 13 wherein the hydrated sodium aluminate is formed by hydrating anhydrous sodium aluminate to form a dry free-flowing powder of hydrated sodium aluminate, and wherein the amounts of carbon dioxide and water vapor supplied are at least one-half mole of carbon dioxide per mole of sodium in said hydrated sodium aluminate and sufficient water to supplement the water in hydrate form in said hydrated sodium aluminate to give a total of at least 1.5 moles of water for each mole of aluminum in said hydrated sodium aluminate.

* * * * *